(12) United States Patent
Croker

(10) Patent No.: US 6,497,395 B1
(45) Date of Patent: Dec. 24, 2002

(54) MOUNTING BRACKET

(75) Inventor: Brian A. Croker, Taplow (GB)

(73) Assignee: APW Ltd., Waukesha, WI (US)

( * ) Notice: Subject to any disclaimer, the term of this patent is extended or adjusted under 35 U.S.C. 154(b) by 0 days.

(21) Appl. No.: 09/696,926

(22) Filed: Oct. 26, 2000

(30) Foreign Application Priority Data

Nov. 2, 1999 (GB) .............................................. 9925818

(51) Int. Cl.[7] .................................................. A47F 5/00
(52) U.S. Cl. .................... 248/300; 248/223.41; 248/73; 248/220.21; 211/94.01; 211/103
(58) Field of Search .......................... 248/300, 49, 73, 248/220.43, 220.22, 220.21, 223.41; 211/94.01, 103

(56) References Cited

U.S. PATENT DOCUMENTS

| | | | | |
|---|---|---|---|---|
| 1,794,700 A | * | 3/1931 | McCaskey | 248/222.11 |
| 2,103,106 A | * | 12/1937 | Yurkovitch | 248/223.41 |
| 3,131,251 A | * | 4/1964 | Ryan | 248/224.51 |
| 3,928,894 A | * | 12/1975 | Bury et al. | 248/467 |
| 4,401,222 A | * | 8/1983 | Kulikowski et al. | 211/94.01 |
| 5,000,411 A | * | 3/1991 | Primeau | 248/223.41 |
| 5,709,057 A | * | 1/1998 | Johnson et al. | 248/219.2 |
| 5,803,414 A | * | 9/1998 | Wright | 248/71 |

FOREIGN PATENT DOCUMENTS

| | | |
|---|---|---|
| EP | 0735284 A2 | 7/1994 |
| GB | 525202 A | 8/1940 |
| GB | 1359150 A | 7/1974 |
| GB | 2 047 519 A | * 12/1980 |

* cited by examiner

*Primary Examiner*—Anita King
*Assistant Examiner*—Naschica S. Morrison
(74) *Attorney, Agent, or Firm*—Quarles & Brady LLP

(57) ABSTRACT

A mounting bracket is disclosed for a fixture element formed with channel means comprising two opposed channel formations, the mounting bracket comprising a bracket body and a flange formation adapted to be slidably received by the channel formtions, the flange formation (4, 6) being held spaced from bracket body (22), the flange formation comprising flange portions (4', 6') which together define a substantially rectangular outline, disregarding any spaces between the flange portions. The flange portions lie substantially in a common plane and are directed generally outwardly, in opposite directions, of the centre (22) of the rectangular outline. The arrangement is such that in use the flange formation is receivable by the channel means (42, 44) of the fixture element (40) in two orientations of the fixture element that are perpendicular to each other.

6 Claims, 2 Drawing Sheets

MOUNTING BRACKET

BACKGROUND OF THE INVENTION

The present invention relates to a mounting bracket and is concerned particularly, although not exclusively with, a mounting bracket for use within an enclosure for housing cabling and associated equipment.

A vast amount of cabling is used in the telecommunication and electronics industry. Existing cabinets that are used to house the junctions of cabling and associated equipment are either floor standing or wall mounted. Easy access to the cabling is important and existing cabinets include panels. Many existing cabinets comprise a frame structure and a plurality of panels mounted thereon. The frame structure includes support members formed by presswork. The members are formed from sheet metal and holes and locating slots are punched through walls of the members. The walls of the members are substantially perpendicular to each other and form common U-shaped channel sections and L-shaped sections.

The support members are often used to support cables using cable ties and cable guides.

Depending upon where on the frame structure the cable guides are to be mounted, different fixings are generally provided for different configurations of cable guide.

SUMMARIES OF THE INVENTION

According to a first aspect of the present invention there is provided a mounting bracket for a fixture element formed with channel means comprising two opposed channel formations, said mounting bracket comprising a bracket body, a bracket spacer fixedly connected to the bracket body and a flange formation fixedly connected to the bracket spacer, whereby said flange formation is held spaced from said bracket body, said flange formation comprising flange portions which together define a substantially rectangular outline, disregarding any spaces between the flange portions, said flange portions lying substantially in a common plane and being directed generally outwardly of the centre of said rectangular outline, whereby in use said flange formation is receivable by said channel means selectively in a first orientation of said fixture element and in a second orientation of said fixture element, said first orientation and said second orientation being substantially perpendicular to each other.

Preferably, the flange formation comprises two spaced-apart, parallel elongate flange regions.

Each flange region is preferably held spaced from the bracket body by a respective web portion of the bracket that extends in a direction away from the bracket body.

The respective lengths of the elongate flange regions are preferably greater than the corresponding lengths of the web portions so as to define retaining lugs at the opposite ends of the elongate flange regions, the retaining lugs being adapted to co-operate with the channel means when the fixture element is assembled to the bracket in the orientation in which the flange regions extend transversely of the channel means.

The mounting bracket preferably comprises attachment means.

The invention also comprises the combination of a fixture element and a mounting bracket in accordance with the first aspect of the invention.

The fixture element is preferably a cable guide number.

BRIEF DESCRIPTION OF THE DRAWINGS.

The present invention may be carried into practice in various ways, but an embodiment will now be described, by way of example only, with reference to the accompanying drawings in which.

DESCRIPTION OF PREFERRED EMBODIMENTS

Figure 1:
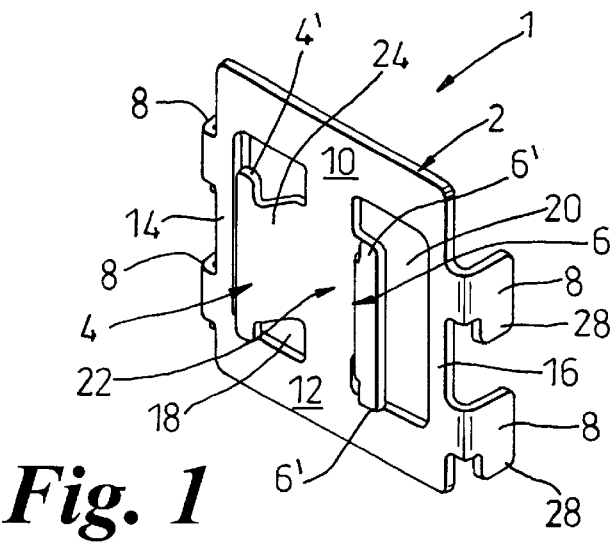
FIG. 1 shows an isometric view of a mounting bracket in accordance with the invention.

Referring to the FIGS. 1 to 4, a mounting bracket 1 for use in an enclosure for housing cabling and associated equipment comprises a square frame body 2, two oppositely directed parallel flange regions 4, 6 and four attachment legs 8.

The square frame body 2 comprises two horizontal parallel members 10, 12 being separated from each other by two vertical parallel members 14, 16. The innermost edges of the frame body 2 define two substantially rectangular holes 18, 20, each of which extend through the frame body 2. A central bridging portion 22 that extends vertically from the member 14 to the member 16 separates the holes 18, 20.

The flange regions 4, 6 are held distant from the frame body by a bracket spacer in the form of respective ramp portions 24, 26 of S-shape in transverse cross-section. Each ramp portion 24, 26 extends in a direction away from the plane of the frame body 2 at an acute angle thereto and to a side edge of the respective flange portion 4, 6. The vertical cross sectional length of the ramp portions 24, 26 is less than the corresponding dimension of the flange regions 4, 6, so as to define retaining lugs 4' and 6' at the upper and lower ends of the flanges 4, 6.

Figure 2:
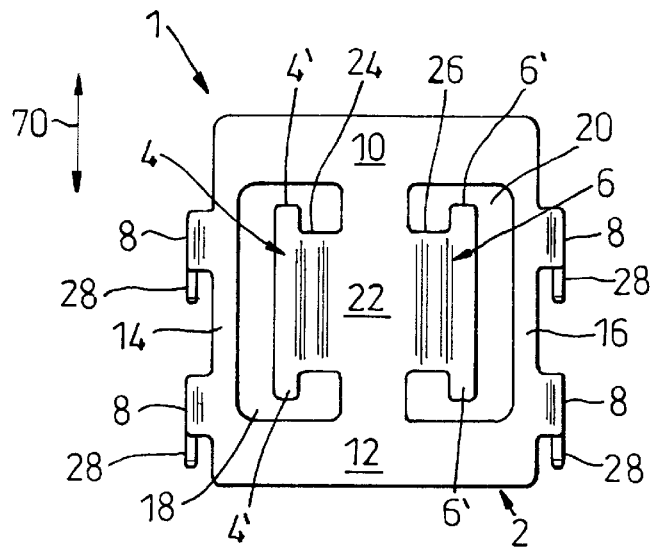
FIG. 2 shows a front view of the mounting bracket shown in FIG. 1.
Figure 3:
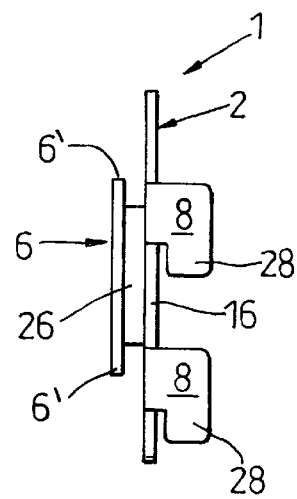
FIG. 3 shows a side view of the mounting bracket shown in FIG. 1.
Figure 4:
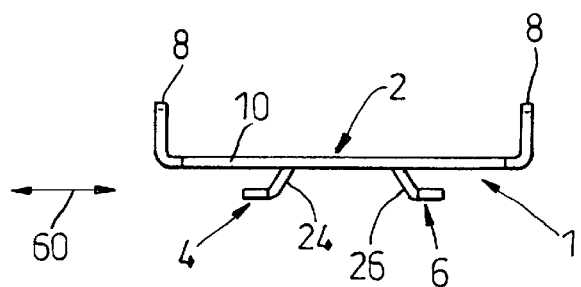
FIG. 4 shows a plan view of the mounting bracket shown in FIG. 1.

It will be seen from FIG. 2 that the flanges 4, 6 including the lugs 4' and 6' define a flange formation of square outline, disregarding the spaces between the lugs 4' and 6'.

Each leg 8 extends away from the frame body 2 in a direction that is perpendicular to the plane of the frame body 2. Each leg 8 comprises a downwardly pointing lobe 28 that is distant from the frame body 2, so as to be of hook-shape.

Figure 6:
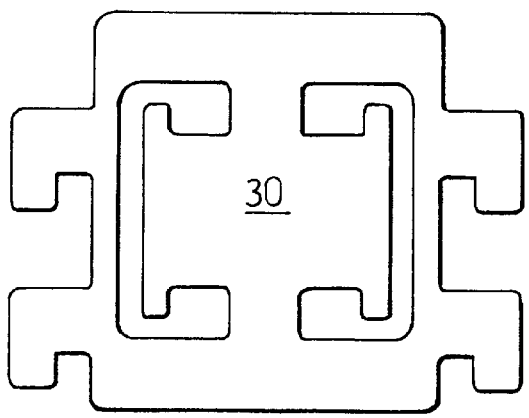
FIG. 6 shows a front view of a stamped blank for the mounting bracket shown in FIG. 1.

The mounting bracket 2 is manufactured from a metal sheet. The metal sheet is stamped to produce planar blanks in the shape 30 as shown in FIG. 6. The blank 30 is then pressed to form the mounting bracket 1. The skilled person will appreciate that the mounting bracket 1 could be manufactured using alternative methods such as, but not limited to, injection moulding, welding or casting.

In use the mounting bracket 1 is attached to a cabinet frame member by hooking the legs 8 into holes formed in the frame member so that the legs 8 are directed downwards. This form of attachment is well known to the skilled addressee.

Figure 5:
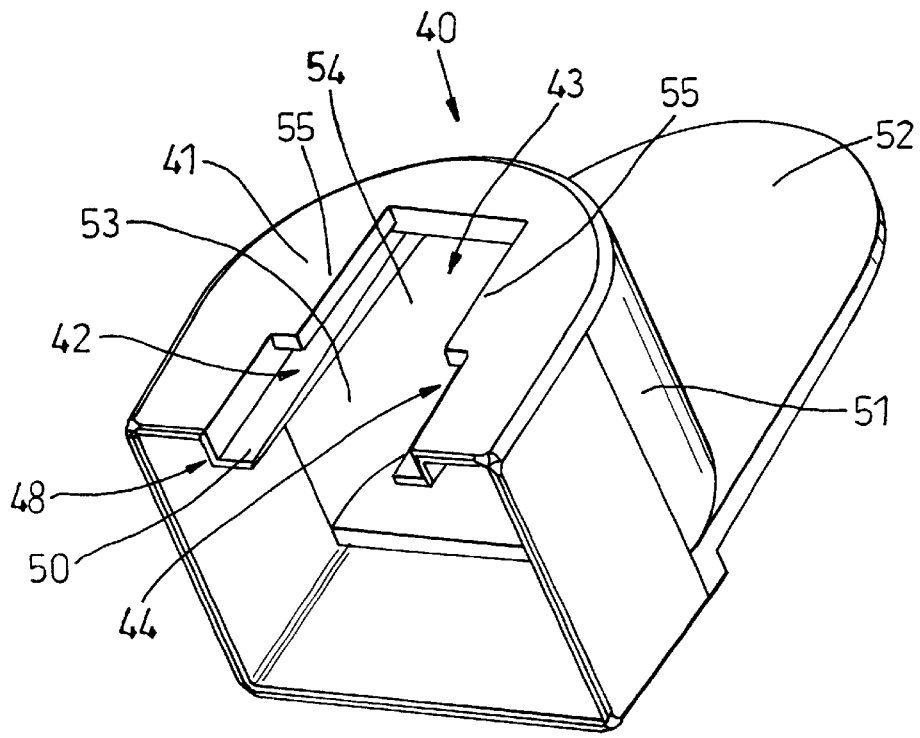
FIG. 5 an isometric view of a fixture element that is mountable on the mounting bracket shown in FIGS. 1 to 4.

A fixture 40 in the form of a cable guide member, shown in FIG. 5, comprises two channel formations 42, 44 adapted to receive the flange portions 4, 6. The fixture 40 can be slid onto the mounting bracket 1 to provide a semi-cylindrical cable guide surface 51 and cable retaining lug 52.

The moulded plastics fixture 40 comprises a back wall 41 formed with a stepped slot 43, the slot 43 comprising portions of larger and smaller widths 53, 54.

A description of channel formation 42 will now follow. Channel formation 44 comprises features corresponding to those of channel formation 42 and hence no further explanation will be given for channel formation 4.

Channel formation 42 comprises a stepped portion 48 having a substantially L-shaped cross-section to define a guide flange 50. The stepped portion 48 extends inwardly from the side section 41. The innermost section 50 of the stepped portion 48 is a wedge shape. About half way along the channel 42 the back wall 41 extends over the stepped portion 48 as a further guide flange 55 so defining the smaller width portion 54 of the slot 43.

As the fixture 40 is slid onto the mounting bracket 1 the mounting bracket flanges 4, 6 enter the respective channels 42, 44. The flanges 4, 6 are clamped by the channels 42, 44 due to the wedge shape of the guide flanges 50.

The fixture 40 can be slid vertically onto the mounting bracket 1 from either below the bracket 1 or from above the bracket 1 in directions 70 (see FIG. 2) in which case the channel formations 42, 44 receive the respective flanges 4, 6, and the flanges 4, 6 all gripped between guide flanges 50 and 55. Alternatively, the fixture 40 can be slid horizontally onto the mounting bracket 1 from either the left-hand side of the bracket 1 or from the right-hand side of the bracket 1 in directions 60 (see FIG. 4) in which case the channel formation 42, 44 receive the retaining lugs 4', 6' between the guide flanges 50, 55, the ramp portions 24, 26 being accommodated between the opposed margins of the pair of flanges 50 and those of the pair of flanges 55.

It will be appreciated that cable guide members of different shapes can similarly be provided with a slot 43 and channel formations 42, 44, as illustrated, to enable them to be mounted on a common design of mounting bracket, thereby avoiding the need for the installer to carry a range of different fixings.

What is claimed is:

1. A combination mounting bracket and a fixture element, said fixture element being formed with a channel having two opposed channel formations, said mounting bracket comprising a bracket body, a bracket spacer fixedly connected to the bracket body, and a flange formation is held spaced from said bracket body, said flange formation comprising flange portions which together define a substantially rectangular outline, disregarding any spaces between the flange portions, said flange portions lying substantially in a common plane and being directed generally outwardly of the center of said rectangular outline, wherein said channel of said fixture element is dimensioned to slidably receive said flange formation when said fixture element is in a first orientation with respect to said flange formation and alternatively in a second orientation being substantially perpendicular to said first orientation with respect to said flange formation.

2. A combination as claimed in claim 1, wherein said flange formation comprises two laterally-spaced-apart, parallel elongate flange regions.

3. A combination as claimed in claim 2, wherein said bracket spacer comprises a pair of ramp portions of said bracket of generally S-shape in transverse cross section.

4. A combination as claimed in claim 1, wherein said fixture element includes a cable guide surface.

5. A mounting bracket for a fixture element formed with a channel comprising two opposed channel formations, said mounting bracket comprising a bracket body, a bracket spacer fixedly connected to the bracket body, and a flange formation is held spaced from said bracket body, said flange formation comprising flange portions which together define a substantially rectangular outline, disregarding any spaces between the flange portions, said flange portions lying substantially in a common plane and being directed generally outwardly of the center of said rectangular outline, whereby in use said flange formation is receivable by said channel selectively in a first orientation of said fixture element and in a second orientation of said fixture element, said first orientation and said second orientation being substantially perpendicular to each other;

wherein the respective lengths of said flange portions are greater than the corresponding dimensions of said bracket spacer so as to define retaining lugs at the opposite ends of each said flange portion, said retaining lugs being adapted to co-operate with the channel when said fixture element is assembled to said bracket in the first orientation in which said flange portions extend transversely of the channel.

6. A mounting bracket for a fixture element formed with a channel comprising two opposed channel formations, said mounting bracket comprising a bracket body, a bracket spacer fixedly connected to the bracket body, and a flange formation is held spaced from said bracket body, said flange formation comprising flange portions which together define a substantially rectangular outline, disregarding any spaces between the flange portions, said flange portions lying substantially in a common plane and being directed generally outwardly of the center of said rectangular outline, whereby in use said flange formation is receivable by said channel selectively in a first orientation of said fixture element and in a second orientation of said fixture element, said first orientation and said second orientation being substantially perpendicular to each other;

further comprising attachment means for attaching the bracket to a structure, said attachment means comprising substantially hook-shaped projections.

* * * * *